United States Patent [19]

Mohebban et al.

[11] Patent Number: 4,589,939
[45] Date of Patent: May 20, 1986

[54] INSULATING MULTIPLE-CONDUCTOR CABLES USING COATED INSERT MEANS

[75] Inventors: Manoochehr Mohebban, Belmont; Willem M. Versteegh; Lester T. Toy, both of Fremont, all of Calif.

[73] Assignee: Raychem Corporation, Menlo Park, Calif.

[21] Appl. No.: 702,117

[22] Filed: Feb. 15, 1985

Related U.S. Application Data

[63] Continuation-in-part of Ser. No. 581,395, Feb. 17, 1984, abandoned.

[51] Int. Cl.⁴ ............................................. H01B 13/22
[52] U.S. Cl. ............................................. 156/49; 156/55; 156/56; 156/86; 156/91; 174/88 R; 174/DIG. 8; 339/275 C; 428/910; 428/913
[58] Field of Search .................. 156/49, 52, 55, 56, 156/86, 85, 91; 174/88 R, 102 R, 102 SC, 105 R, 106 SC, 113 R, DIG. 8; 428/910, 913; 339/275 R, 275 C

[56] References Cited

U.S. PATENT DOCUMENTS

| 3,582,457 | 6/1971 | Barthell | 156/86 X |
| 4,283,239 | 8/1981 | Corke et al. | 156/86 X |
| 4,298,415 | 11/1981 | Nolf | 156/85 |
| 4,304,616 | 12/1981 | Richardson | 156/86 |
| 4,490,426 | 12/1984 | Franckx | 156/55 X |

FOREIGN PATENT DOCUMENTS 2019120 10/1979 United Kingdom .

Primary Examiner—Robert A. Dawson
Attorney, Agent, or Firm—Edith A. Rice; Herbert G. Burkard

[57] ABSTRACT

The conductors of multi-conductor, medium voltage, power cables, at locations where the cable insulation has been removed, are insulated by positioning between the conductors or cores, an insert, at least the surface of which comprises a first void-filling material capable of forming a substantially void-free interface with each conductor, placing a second void-filling material over the conductors and recovering a dimensionally recoverable polymeric sleeve over the resulting assembly. The method is particularly useful to provide insulation between conductors of a joint between two multi-conductor, medium voltage power cables.

18 Claims, 3 Drawing Figures

U.S. Patent   May 20, 1986   Sheet 1 of 2   4,589,939
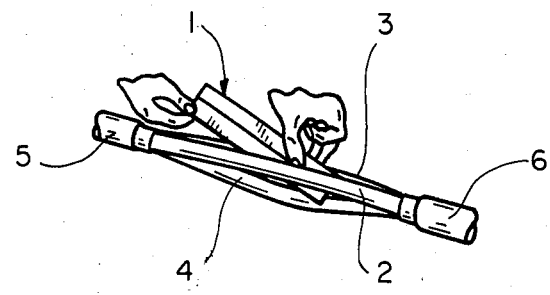
FIG_1
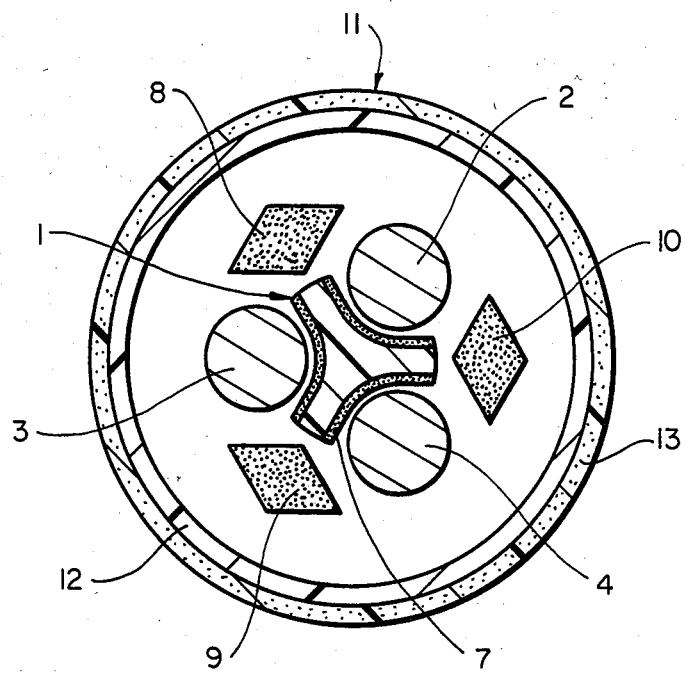
FIG_2

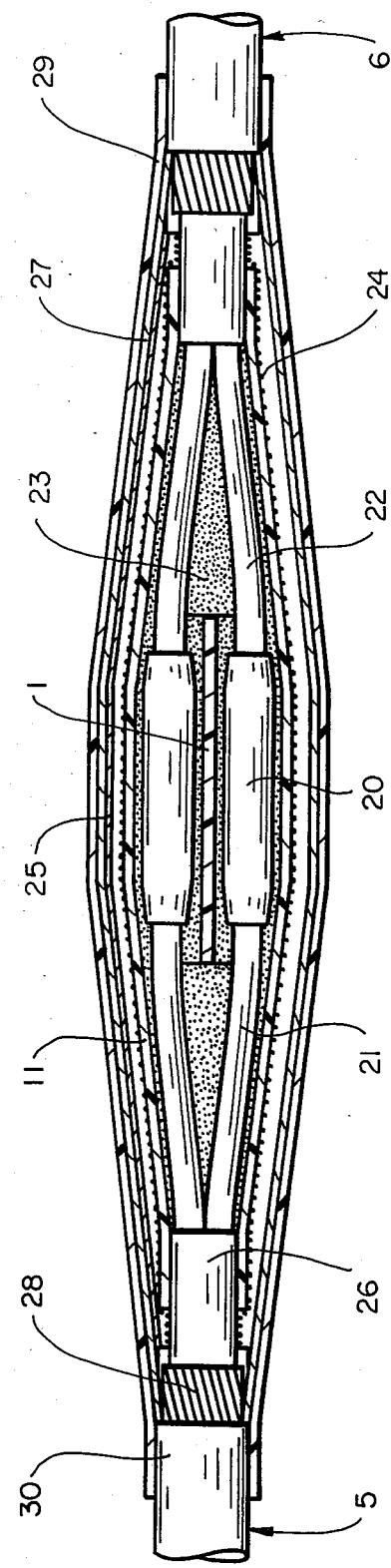
FIG_3

INSULATING MULTIPLE-CONDUCTOR CABLES USING COATED INSERT MEANS

This application is a continuation-in-part of U.S. application Ser. No. 581,395 filed Feb. 17, 1984, now abandoned, the disclosure of which is incorporated herein by reference.

BACKGROUND OF THE INVENTION

This invention relates to a method of insulating multi-conductor, medium-voltage electrical power cables at locations where the cable insulation has been removed, and, in particular, to insulating a joint between such cables and to the resulting joint. Medium voltage is used herein to specify voltages in the range of about 1 to about 36 kilovolts (kV).

It has long been known to insulate a joint between multi-conductor cables with a cured resin system. Typical AC multi-conductor cables contain three conductors at the same voltage but in different phases. Conventionally, a joint between such cables is enclosed by a metal or plastic joint box. Resin is poured through vents in the box and allowed to cure. The cured resin insulates the conductors from each other and from the joint box. To prevent the conductors of the cable from contacting each other, a solid separator can be placed between the conductors. It has been found that the resin, which is typically at an elevated temperature when it is poured into the joint box, tends to solidify when it touches the cold conductors. This can result in voids between the conductors and between the conductors and spacer, if one is used. This method of insulating joints is cumbersome and time consuming.

Another method of insulating joints is to use a heat shrinkable enclosure such as that disclosed in U.S. Pat. No. 4,383,131. This technique has been used with single core cables and with multi-conductor cable. When used with multi-conductor cables, each of the conductors of the cable is generally separately insulated and shielded. A heat shrinkable enclosure is then installed over the joint. Enclosing and insulating a joint by this method requires numerous steps to install the various insulating and shielding components.

This invention relates to a method of using a heat-shrinkable enclosure to provide insulation between the conductors of a joint between multi-conductor, medium-voltage power cables, which method provides the advantages of a resin filled system without the inconvenience and other disadvantages typically associated with such systems, while maintaining the advantages of ease of installation of heat-shrinkable systems without requiring individual insulation and shielding of each conductor.

BRIEF DESCRIPTION OF THE DRAWINGS

FIG. 1 illustrates insertion of the insert between the conductors of a joint between two 3-conductor 11 kV belted power cables.

FIG. 2 is a cross-sectional view of the joint just prior to recovery of the dimensionally recoverable sleeve during installation of the joint in accordance with this invention.

FIG. 3 is a longitudinal view of the joint insulated in accordance with this invention.

SUMMARY OF THE INVENTION

This invention provides a method of insulating the conductors of a multi-conductor, medium voltage power cable at a location where the cable insulation is removed, each of said cables having at least three conductors, said method comprising:
 (a) selecting an insert shaped such that when it is positioned between the conductors of the cables it lies between each of the conductors, said insert, at least the surface of said insert comprising a first void-filling material capable of forming a void-free interface with each conductor;
 (b) positioning the insert between the conductors such that it lies between each of the conductors;
 (c) positioning a dimensionally recoverable polymeric sleeve over the resulting assembly; and
 (d) causing the sleeve to recover.

Another aspect of this invention comprises a method of insulating a joint between multiple-conductor, medium voltage power cables, each of said cables having at least three conductors each surrounded by a dielectric layer a portion of which has been removed to expose an end region of the conductor, the conductors of one cable being connected to the corresponding conductors of a second such cable, said method comprises:
 (a) selecting an insert shaped such that when it is positioned between the conductors of the cable it lies between each of the conductors, at least the surface of said insert comprising a first void-filling material capable of forming a void-free interface with each conductor;
 (b) positioning the insert between the conductors such that it lies between each of the conductors;
 (c) positioning a dimensionally recoverable polymeric sleeve over the resulting assembly; and
 (d) causing the sleeve to recover.

A second void-filling material capable of flowing due to the pressure and/or heat exerted by the recovery of the sleeve may be positioned over the conductors prior to installation of the recoverable sleeve.

The dimensionally recoverable sleeve is preferably a heat-shrinkable sleeve. The insert is preferably a polymeric material which does not melt at operating temperatures of the cable, including temperatures reached under fault conditions and is preferably coated with a first void-filling material which melts and flows during installation of the insulation to form a void-free interface between the insert and each conductor of the cable.

The first and second void-filling materials may be the same or different materials and either may be of an insulating or a stress grading material. The dimensionally recoverable sleeve preferably has an inner insulating layer, which is preferably elastomeric, and an outer conductive polymeric layer. Such a sleeve may be formed by coextrusion or molding.

A joint insulated by the method of this invention may also be provided with an outer protective jacket which may be applied as a dimensionally recoverable polymeric sleeve. Further protection of the joint may be provided by means of a liner, preferably of metal slats, positioned over the joint before installation of the outer protective jacket.

DETAILED DESCRIPTION OF THE INVENTION

This invention relates to insulating the conductors, or cores, of multi-conductor, medium voltage power cables at locations, such as joints between such cables, where the original cable insulation has been removed. The term conductor has been used in the specification and claims to refer to the current carrying element and can be the bare conductor or the conductor surrounded by primary insulation. The conductor plus primary insulation is generally referred to in the art as a core. Medium voltage A.C. power cables typically have three conductors but cable configurations containing additional conductors are known. By the term "medium voltage power cables" is meant electrical cables which conduct electricity at voltages between about 1 kV and 36 kV. Such voltages are also referred to as distribution voltages.

This invention is described in detail below for a joint between 11 kV belted cables. It is to be understood that the techniques of this invention can be employed with other types of multi-conductor power cables wherever restoration of the insulation between the conductors is desired. 11 kV belted cables are well known and generally contain three conductors each surrounded by oil-impregnated cable insulation with paper or jute filler surrounding the insulated conductors. A layer of belt insulation surrounds the wormings and a metallic sheath, e.g. of aluminum or lead, surrounds the belt layer. Armor wires, or other armoring, may be provided on the outside of the metallic sheath. A protective jute or polymeric jacket is on the outside of the armor wire, if present, or the metallic sheath where there is no armor wiring.

In preparing a joint between such cables, the conductors are exposed by removing the outer layers of the cable structure and the oil impregnated paper insulation surrounding each conductor. The conductors are generally of a highly conductive metal such as copper or aluminum. The conductors can be solid and can be circular, oval or sectored. Alternatively, the conductors can be made up of numerous metal strands forming what is known as stranded conductors. The conductors of the cables to be joined are connected together by a suitable connector. Typical conductors comprise a metal cylinder which are crimped down onto and/or soldered to the conductors. A preferred connector is that described in commonly assigned copending application Ser. No. 598,557, filed Apr. 9, 1984, the disclosure of which is incorporated herein by reference. Each conductor of the first multi-conductor cable is connected to a conductor of a second multi-conductor cable.

Before installing the insulation assembly of this invention, the individual conductors and connectors may be provided with initial insulation by wrapping an insulating tape or placing an insulating sleeve around the exposed portion and an adjacent insulated portion of each conductor and the connector. This may be done using several individual sleeves, e.g. one sleeve over the connector and separate sleeves over the adjacent conductor regions.

In a preferred method, each exposed conductor portion and adjacent core section is insulated with a recovered dimensionally recoverable, preferably heat-shrinkable, polymeric sleeve. The polymeric sleeve is preferably of an oil resistant material, for example polyvinylidene fluoride, when the cables being jointed are oil-impregnated paper insulated cables.

The term "recoverable article" is used herein to mean an article the dimensional configuration of which may be made substantially to change when subjected to some treatment. Heat-recoverable articles, which recover when heated, are particularly preferred in the practice of this invention. Usually these articles recover, towards an original shape from which they have previously been deformed but the term "recoverable", as used herein, also includes an article which adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, while hot, to a dimensionally heat-unstable form but, in other applications, a preformed dimensionally heat-stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article while in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an inner tubular member is held in a stretched state by a second member, such as an outer tubular member, which, upon heating weakens and thus allows the elastomeric member to recover.

Articles which are dimensionally recoverable without the application of heat are described in U.S. Pat. Nos. 4,070,746, 4,179,320 and 4,338,970. Such articles comprise an elastomeric member held in a stretched state by a retaining member. The elastomeric member is retained in the stretched state until released from the retaining member by application of solvent or by mechanically breaking or removing the retaining member. Typically, such articles comprise an elastomeric tube held in a stretched state by an outer tubular member to which it is adhered.

Each connector is preferably insulated with a polymeric insulating layer. Again, the insulating layer can be tape or a recovered dimensionally recoverable polymeric sleeve. Preferably a stress grading material is placed around the conductor prior to recovering the sleeve. The term "stress grading material" is used herein to mean a material which when applied to areas of high electrical stress, relieves or reduces the stress. The stress grading material preferably is a mastic or other polymeric material having an impedance in the range of about $1 \times$ to $10^9$ ohm-cm to about $5 \times 10^9$ ohm-cm, measured at 40–80 Hertz. The material can be applied over each connector in the form of a maleable filling compound, tape, sheet or the like. A preferred material that can be used is an epihalohydrin based composition such as that disclosed in U.S. Pat. No. 4,378,463 to Senior et al the disclosure of which is incorporated herein by reference.

Following initial preparation of the conductors in the above (or similar) manner, the joint is insulated in accordance with the method of this invention. An insert is positioned between the conductors. The insert is shaped such that it lies between each of the conductors. Generally, for a three-conductor cable, the insert is in the shape of "Y". At least the surface of the insert comprises a first void-filling material which is capable of forming a void-free interface between the insert and each of the conductors. Preferably, the insert should be sufficiently flexible to enable it to accommodate the configuration of the conductors in the cable.

The insert should be of a material which does not melt at temperatures reached during installation of the heat recoverable sleeve or at temperatures reached during fault conditions of the cable. The insert serves to insulate the conductors of the joint from each other and to prevent them from migrating toward each other. If the insert melts, the conductors may not be kept separate from each other and if they touch when the cable is operating, premature failure of the joint may occur.

The insert may be made from a material, such as a polymeric gel, as described below, capable of forming a voidfree interface with each conductor. In a preferred embodiment the insert comprises a material which itself is not a void-filling material but is coated with a first voidfilling material.

Preferably the insert is formed of a polymeric insulating material having a dielectric constant in the range of between about 2 to about 6, preferably about 2.5 to about 3.2. For example, the insert may be formed of a polymeric gel or a polymeric material. A polymeric insert can be formed by conventional methods, such as extrusion, molding and the like. The insert can contain a metal layer, preferably embedded in the body of the insert, to electrically shield the conductors from one another.

The first void-filling material, which may be insulating or stress grading, is formed of a sealant such as a mastic or gel. A mastic is an adherent, cohesive sealing material capable of filling a gap between two components. A mastic can deform or yield plastically, that is, undergo viscous flow, both during application and in subsequent service at ambient temperatures. Mastics may consist of mixtures of substantially non-crystalline materials, for example, bituminous materials, elastomers, or thermoplastic polymers, and may contain insert fibrous or powdered fillers. The term "gel", as used herein, refers to a swollen cross-linked polymeric material, for example, a matrix of cross-linked rubber containing oil. A preferred gel for use herein is that described in U.S. application Ser. No. 646,555, filed Aug. 31, 1984, the disclosure of which is incorporated herein by reference.

Preferably, the void-filler is a thermoplastic material having a viscosity at 70° C. of between about $1 \times 10^3$ to about $1 \times 10^5$ poise. On application of heat to recover a heat recoverable sleeve placed over the joint, the void-filling material melts and flows filling voids between the conductors and the insert. The void-filler can be applied to the insert by any convenient technique, for example as a maleable ("putty-like") material, as a tape, or the like.

A second void-filling material can, and preferably is, applied around the conductors after the insert is positioned. This additional void-filler can be applied by any convenient technique. One method of applying the void-filler is to use it in the form of a tape and wrap one or more layers over the assembly of conductors plus insert. The second void-filler can be a sealant, grease, mastic or gel and can be the same or different than the first voidfilling material discussed above. Another technique is to provide the second void-filler in the form of diamond-shaped profiles of a material which flows under heat and/or pressure. Each profile is positioned over the gap to adjacent conductors and extending between them. On installation of the recoverable sleeve over the assembly the pressure of the sleeve and/or heat, if applied to recover the sleeve, causes the void-filling material to flow around the conductors filling all voids.

Additional stress control material such as that described above, is advantageously applied in areas subject to electrical stress.

A dimensionally recoverable polymeric sleeve, which may be in the form of a tube, sheet or tape capable of being formed and held in the shape of a tube, is installed over the assembly after the insert and void-filling materials have been appropriately positioned. In a preferred embodiment the heat recoverable sleeve has an inner insulating layer and an outer semi-conductive layer. The sleeve is positioned so that it overlaps the lead sheaths of the cables and is then recovered. The insulating and conductive layer can be applied as separate heat recoverable sleeves, if desired. The outer conductive layer is electrically connected to the lead sheaths of the cables, for example by means of a metal mesh which extends across the sheath.

The invention can also be used to insulate joints between shielded power cables. In such event, the method of enclosing joints between shielded cables disclosed in U.S. Pat. Nos. 4,383,135 to Clabburn and 4,390,745 to Boettcher can be used.

An outer protective jacket enclosing the entire joint can be applied. Preferably the protective jacket is a polymeric tubular article. The tubular article also is preferably installed as a dimensionally recoverable, preferably heat recoverable, tubular article or wrap-around sleeve.

If the cables are armored, armoring must be established across the joint. This can be accomplished by using a metal liner under the heat recoverable sleeve. An example of a metal liner which can be used is described in commonly assigned copending application Ser. No. 374,558, the disclosure of which is incorporated herein by reference. A heat recoverable sleeve is then positioned over the liner and recovered.

Turning now to the drawings which illustrate an embodiment of this invention, FIG. 1 illustrates positioning a sealant-coated insert between the conductors 2, 3 and 4 of a joint between cables 5 and 6.

FIG. 2 is a cross-sectional view of a joint insulated in accordance with this invention. Insert 1 has been positioned between conductors 2, 3 and 4. The surface of insert 1 comprises a coating, 7, of mastic. Diamond-shaped profiles 8, 9 and 10 of void-filling mastic composition are positioned around the conductors. A heat-recoverable polymeric sleeve, 11, comprising an inner layer, 12, of insulating polymeric material and an outer layer, 13, of conductive polymeric material encloses the assembly. FIG. 2 illustrates the joint just prior to recovery of the sleeve. On application of heat to effect recovery of the sleeve, the void-filling mastics of profiles 8, 9 and 10 and of coating 7, melt and flow filling substantially all voids between insert 1 and conductors 2, 3 and 4 and between the conductors themselves and the conductors and the recovered sleeve.

FIG. 3 is a longitudinal view of the completed joint. In FIG. 3, each of the connectors, conductors and adjacent insulation have been covered by initial insulation by means of polymeric sleeves 20, 21 and 22. The third set of conductors is blocked from view by insert 1. The void filling material, 23, is derived from the melting of coating, 7, and profiles 8, 9 and 10 shown in FIG. 2. The heat and pressure of recovery of the polymeric sleeve, 11, having caused the void-filling materials to fill all spaces between the insert, conductors and polymeric sleeve.

A metal braid, 24, and screen, 25, are positioned over the top of the recovered sleeve, 11, and are connected to metal sheath 26 of each of cables 5 and 6. For the sake of simplicity one cable only is marked with reference numerals. A liner, 27, comprising elongate metal strips is positioned over the joint and connected to armor wires 28 of each cable. This provides continuity of the armoring of the cables. An outer protective jacket, 29, applied in the form of a heat-recoverable sleeve is installed over the joint and onto the outer jacket 30 of each cable.

The invention has been described, as noted above, primarily with regard to its use in insulating a joint between 3-phase 11 kV belted cables. The invention is not to be construed as limited to such joints and can be used to insulate joints between shielded power cables, plastic insulated power, paper insulated draining and non-draining mass impregnated cables and can also be used to insulate the conductors wherever the original cable insulation has been removed, for example in preparing terminations or the like, or where the insulation has been removed by accidental damage or destruction.

I claim:

1. A method of insulating the cores of a multiconductor, medium voltage power cable, at a location where the cable insulation is removed, said method comprising:
   (a) selecting an insert shaped such that when it is positioned between the conductors of the cable it lies between each of the conductors, at least the surface of said insert comprising a first void-filling material capable of forming a void-free interface with each conductor;
   (b) positioning the insert between the conductors such that it lies between each of the conductors;
   (c) positioning a dimensionally recoverable polymeric sleeve over the resulting assembly; and
   (d) causing the sleeve to recover.

2. A method in accordance with claim 1, which further comprises the step of positioning a second void-filling material around the conductors.

3. A method in accordance with claim 2, wherein the second void-filling material is positioned by placing the void filling material over the conductors in the form of shaped profiles.

4. A method in accordance with claim 1, wherein the dimensionally recoverable sleeve is heat shrinkable and the step of causing the sleeve to recover comprises applying heat to the sleeve.

5. A method in accordance with claim 4, wherein the heat shrinkable sleeve comprises an inner elastomeric layer and an outer conductive layer.

6. A method in accordance with claim 1, which further comprises applying a stress grading material to areas of high electrical stress.

7. A method in accordance with claim 1, which further comprises applying an initial insulating layer around each of the connectors and adjacent conductor regions.

8. A method in accordance with claim 7, in which the initial insulating layer is applied by positioning dimensionally recoverable sleeves over the connector and causing the sleeve to recover.

9. A method of insulating a joint between multiple-conductor, medium voltage power cables, each of said cables having at least three conductors each surrounded by a dielectric layer a portion of which has been removed to expose an end region of the conductor, the conductors of one cable being connected to the corresponding conductors of a second such cable, said method comprises:
   (a) selecting an insert shaped such that when it is positioned between the conductors of the cables it lies between each of the conductors, at least the surface of said insert comprising a first void-filling material capable of forming a void-free interface with each conductor;
   (b) positioning the insert between the conductors such that it lies between each of the conductors;
   (c) positioning a dimensionally recoverable polymeric sleeve over the resulting assembly; and
   (d) causing the sleeve to recover.

10. A method in accordance with claim 9, which further comprises the step of positioning a second void-filling material around the conductors.

11. A method in accordance with claim 10, wherein the second void-filling material is positioned by placing the void filling material over the conductors in the form of shaped profiles.

12. A method in accordance with claim 9, wherein the dimensionally recoverable sleeve is heat shrinkable and the step of causing the sleeve to recover comprises applying heat to the sleeve.

13. A method in accordance with claim 12, wherein the heat shrinkable sleeve comprises an inner elastomeric layer and an outer conductive layer.

14. A method in accordance with claim 9, which further comprises applying a stress grading material to areas of high electrical stress.

15. A method in accordance with claim 9, which further comprises applying an initial insulating layer around each of the connectors and adjacent conductor regions.

16. A method in accordance with claim 15, in which the initial insulating layer is applied by positioning dimensionally recoverable sleeves over the connector and causing the sleeve to recover.

17. A method in accordance with claim 9, which further comprises positioning a liner over the recovered sleeve.

18. A method in accordance with claim 17, which further comprises applying an outer protective jacket over the joint.

* * * * *

UNITED STATES PATENT AND TRADEMARK OFFICE
CERTIFICATE OF CORRECTION

PATENT NO. : 4,589,939

DATED : May 20, 1986

INVENTOR(S) : Manoochehr Mohebban et al.

It is certified that error appears in the above-identified patent and that said Letters Patent is hereby corrected as shown below:

Col. 5, line 26, delete "voidfree" and insert in lieu thereof -- void-free --.

Col. 5, line 29, delete "voidfilling" and insert in lieu thereof -- void-filling --.

Col. 6, line 6, delete "voidfilling" and insert in lieu thereof -- void-filling --.

Col. 4, line 63, after 1X delete "to".

Signed and Sealed this

Eighteenth Day of November, 1986

Attest:

DONALD J. QUIGG

Attesting Officer     Commissioner of Patents and Trademarks